May 11, 1926.
G. P. LUCKEY
1,583,984
CHRONOMETRIC INDICATING INSTRUMENT
Filed Nov. 16, 1925      2 Sheets-Sheet 1
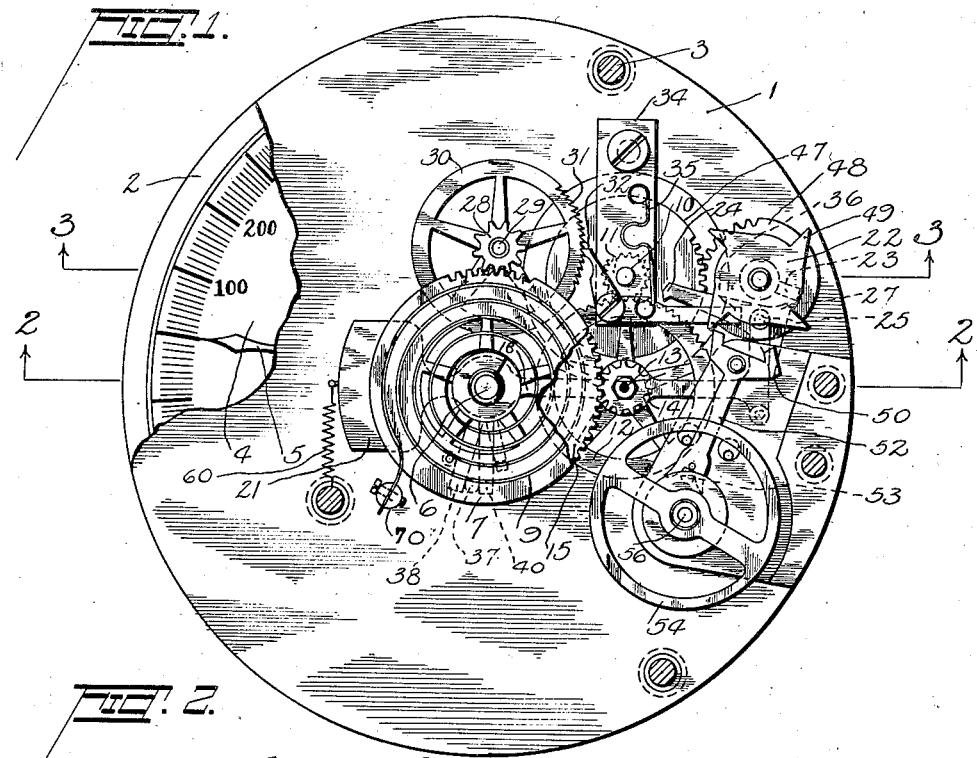
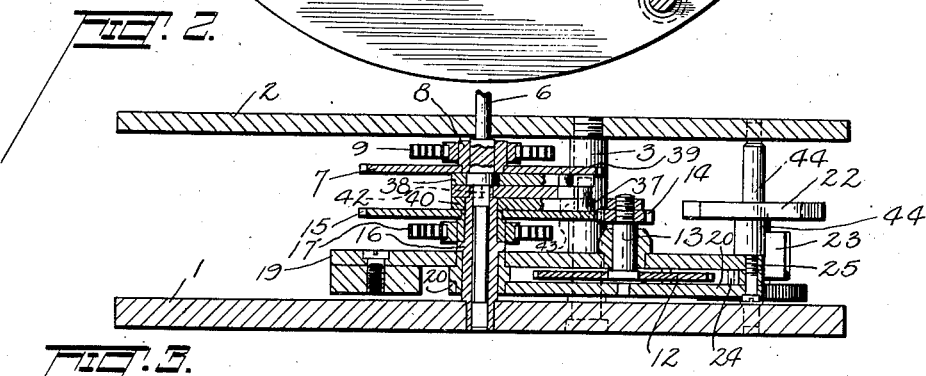
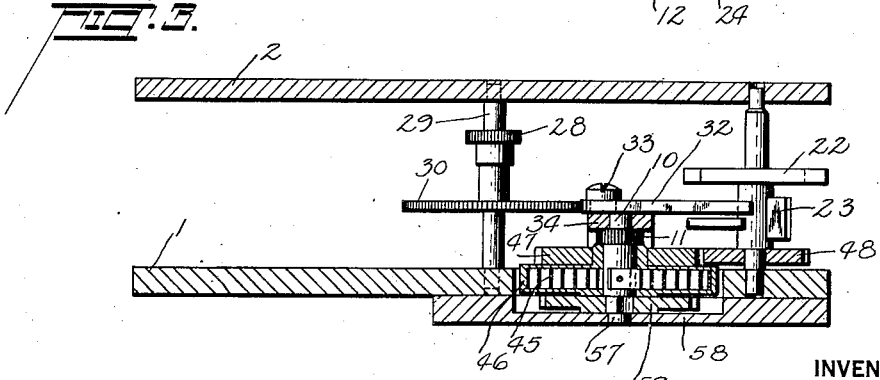
INVENTOR
GEORGE P. LUCKEY
BY *Robert A. Young*
ATTORNEY May 11, 1926.
G. P. LUCKEY
1,583,984
CHRONOMETRIC INDICATING INSTRUMENT
Filed Nov. 16, 1925  2 Sheets-Sheet 2
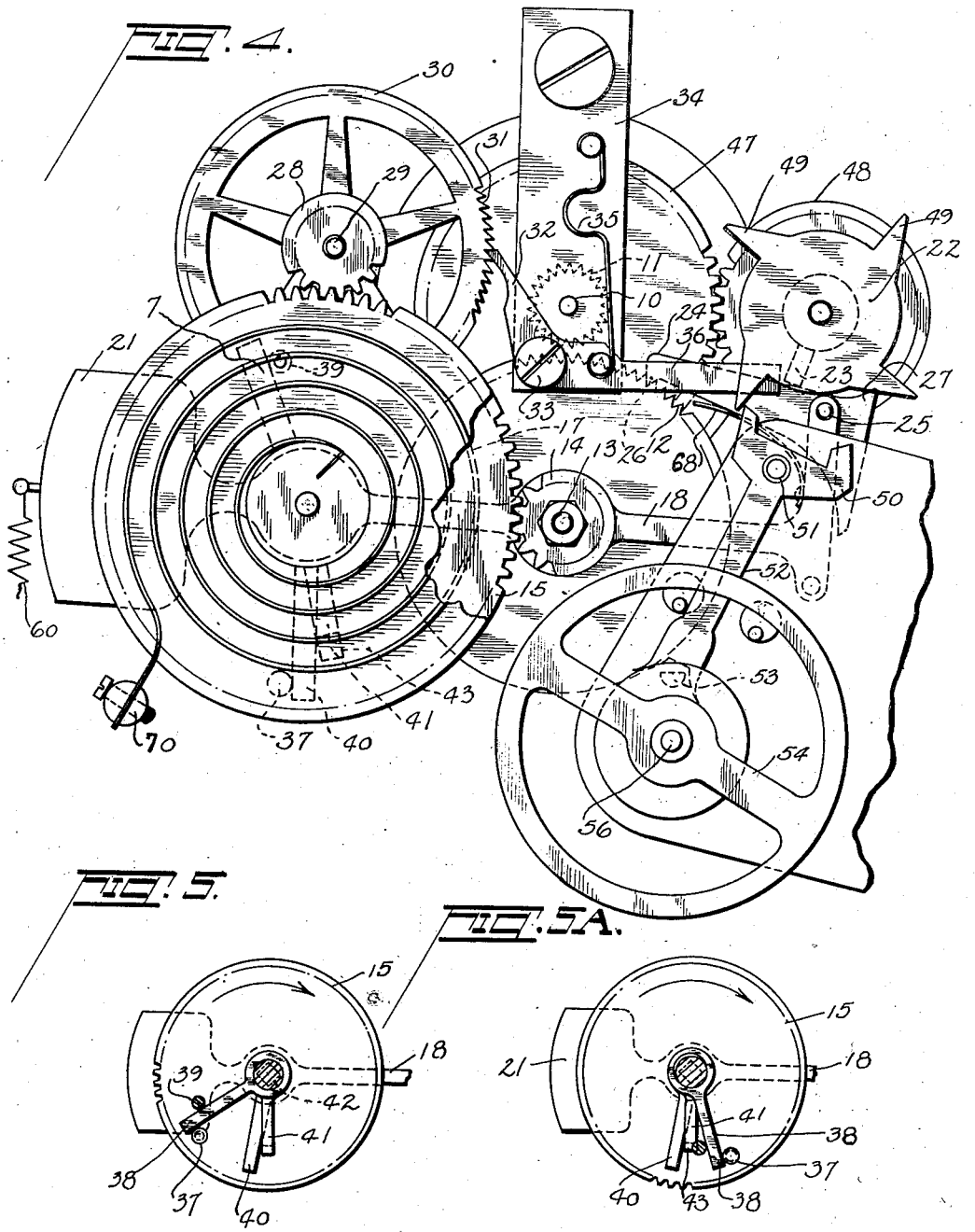
INVENTOR
GEORGE P. LUCKEY
BY Robert H. Young
ATTORNEY Patented May 11, 1926.

1,583,984

UNITED STATES PATENT OFFICE.

GEORGE P. LUCKEY, OF DAYTON, OHIO.

CHRONOMETRIC INDICATING INSTRUMENT.

Application filed November 16, 1925. Serial No. 69,423.

This invention relates to indicating instruments of the class in which the number of movements of one operation is indicated in relation to the number of movements of a second operation. The invention is shown in the form of a chronometric tachometer or speed indicator, although it is applicable to other uses.

The primary object of the invention is the provision of an indicator of the above character, which will be accurate and positive in operation and which is susceptible of easy assembly and dis-assembly of the parts without the necessity of unnecessary trouble in assembling the parts in their proper coordination.

A further object is the reduction of the number of operating parts of the instrument and provision of an instrument of this character which will have parts of simple form, which may be accurately fitted together.

Speed indicators of the class to which this invention belongs comprise an indicating member which operates in conjunction with a scale or dial, and which is provided with a spring tending normally to return it to zero position, a driving member which is driven forward at a speed corresponding to the speed of the device with which the indicator is to be used, a positioning member which is adapted to be driven forward by the driving member and is adapted to drive or move the indicating member in one direction, a spring serving to return the positioning member to its initial position, and means for periodically releasing the positioning member.

These parts are so arranged that, when the device is set in operation, the driving member will be geared to, and will drive the positioning member, and the latter will drive the indicating member during a certain interval of time and at the end of the time interval, the indicating member is locked from backward rotation, while the positioning member is thrown out of gear with the driving member and returns to its initial position. During the second interval of time, the positioning member is geared to the driving member and is driven forward thereby; and, at the end of this second time interval, the indicating member is released so that it may move backward to assume a position determined by the positioning member at that time. After the indicating member is thus positioned, the positioning member will again return to its initial position to be again driven forward during successive intervals of time. In this way the indicating member is reset at the end of each time interval to indicate the speed of the machine during the preceding time interval.

The invention is also applicable to instruments of a type other than speed indicators, and may be used where a number of movements of one operation is to be measured in terms of the number of movements of the second operation.

It is, therefore, a further object of this invention to provide in such an indicating device as above set forth, an intermediate gear which is so mounted upon an arm, the arm being oscillatably mounted about the axis of the positioning member, that the gear and arm may be moved together at the proper time so as to engage the driving member with the indicating member, or disengage the same, this intermediate gear and this arm remaining in engagement with the positioning member and being held so as to lock the positioning member in its assumed position. For this purpose a speed decreasing gear is provided between the driving member and the positioning member, so that a pawl in engagement with the teeth on the periphery on the intermediate gear will lock the positioning member exactly in the position it has assumed at the time it is thrown out of gear with the driving member. To this end, the arm which holds intermediate or speed decreasing gear is also provided with a pivoted stop lever, so that a cam may operate upon this lever to first hold the intermediate or speed decreasing gear, and then immediately thereafter to force this gear out of engagement with the driving gear.

The further object of the invention is a provision of a timing cam which will be of simple construction, and rigidly or integrally mounted upon the escapement wheel itself, so that the device may be very simply timed and easily assembled.

A further object is the provision of a holding wheel for the speed indicator of the character discussed, which will be geared to the indicator wheel, a holding ratchet pawl being provided upon the teeth on the periphery of the holding gear, so as to hold the indicator in its adjusted position against reverse movement in an accurate manner. The holding pawl for this holding wheel is operated directly by the cam arm at the proper time in relation to the operation of the previously mentioned stop lever, so that the indicator may assume the position of the positioning member when permitted to do so by the release of this holding pawl.

A further object is the provision of a stop member mounted upon the arm which holds the intermediate or speed decreasing gear, the stop member being automatically operated upon pre-determined maximum movement of the positioning member, so as to prevent the positioning member and the indicator from being moved past a safe pre-determined limit.

Other objects and advantages of my invention will be more fully discussed and set forth in the following description and claims which relate to one embodiment of my invention, chosen for the purpose of illustration.

In the drawings—

Fig. 1 is a top view of the instrument with the top cover plate partially removed.

Fig. 2 is a central vertical section on line 2—2 of Fig. 1, also showing the positioning arms and positioning pins in reference to the positioning member.

Fig. 3 is a section on the line 3—3 of Fig. 1, showing the clock escapement drive mechanism.

Fig. 4 is an enlarged view of the principal parts of the drive mechanism.

Fig. 5 is a section on the line 5—5 of Fig. 2, showing the positioning arms with the indicator moved a slight distance, and Fig. 5$^A$ is a section corresponding to Fig. 5 with the positioning arms and pins in a different position, showing nearly one complete revolution of the indicator.

Referring more particularly to the drawings by reference numerals, the indicator is shown as provided with a base plate 1, and the top plate 2 which are spaced apart by the spacing studs 3. Top plate 2 serves as a mount for an indicating dial 4 which cooperates with the indicator needle 5 fixed upon the indicator shaft 6 which is journaled in the top plate 2. Rigid with the shaft 6 is an indicator wheel 7 which is pressed upon a sleeve 8, this sleeve 8 being pressed upon the shaft 6. Firmly attached to the sleeve 8 is one end of an indicating spring 9, the other end of which is fixed in position by fastener 70 attached to part 21 or to the plate 1 of the instrument. This indicator spring 9 tends to rotate the indicator in a counterclockwise direction as viewed from the top.

A drive shaft 10 is journaled within the base plate 1, and is adapted to be connected to the device, the speed of which is to be measured. This drive shaft 10 is rigid with a drive gear 11 which is provided with saw teeth upon its periphery, adapted to engage with saw teeth in the periphery of a speed decreasing gear 12 of comparatively large size. This speed decreasing gear 12 is mounted upon a shaft 13 which also has mounted thereon a speed decreasing pinion 14, having teeth which engage with the teeth of the positioning gear 15 which is mounted co-axially with the indicator wheel 7. The positioning gear 15 is freely rotatable upon the sleeve 16 which is journaled at its lower end in the base plate 1 for free rotary movement. The sleeve 16 forms a mounting for the indicator shaft 6 as shown, so that the sleeve 16 and the shaft 6 are both free to rotate although held against endwise movement. The gear 15 is firmly attached to a helical positioning gear spring 17, the other end of which is firmly attached to the post 70 or on the plate 1 or weight 21, in a manner similar to the attachment of the indicator spring 9. The spring 17 serves to urge the positioning gear 15 in counterclockwise direction, so that it will be returned to zero position when released.

Suitably keyed upon the sleeve 16 so as to rotate therewith is a speed decreasing gear arm 18 having upper plate 19 and a lower plate 20 within which is journaled the shaft 13 bearing the speed decreasing gears 12 and 14. A counter-balancing weight 21 is provided upon the opposite side of the axis of rotation from the plates 19 and 20. The arm 18 is adapted to be moved about the axis of the shaft 6 and sleeve 16, so that the speed decreasing gear 12 is moved out of engagement with the drive gear 11, while the gear 14 still remains in engagement with the positioning gear 15. A spring 60 fastened to the weight 21 acts to normally maintain gears 11 and 12 engaged. This action is also assisted by the force of spring 17.

In order to periodically move the arm 18 to release the positioning gear 15 from the driving gear 11, an escapement wheel 22 is adapted to operate a cam arm 23 in a manner which will be later described, so that a stop lever 24 which is pivotedly mounted on a shaft 25 on the arm 18 will be directly engaged by the cam arm 23, so as to force the V-shaped tooth 26 of this stop lever into engagement with the teeth of the speed decreasing gear 12. Immediately thereafter the further rotation of the cam arm in a counterclockwise direction (see Figs. 1 and 4) will force the arm 18 in a clockwise direction through a small distance, about the axis of the sleeve 16, so that the gear 12 is disengaged from the drive gear 11, as shown in Fig. 4; the stop lever 24 meanwhile maintaining the gear 12 in a stationary position. Upon further rotation of the cam 23 from the position shown in the Fig. 4, a projection 27 on the other end of the stop arm will be engaged by the cam, so that the tooth 26 will be withdrawn from the gear 12;

although the gear 12 will still be held out of engagement with the drive gear 11 by the pressure of the cam arm 23 on the end of the stop arm, and consequently upon the arm 18. When the gear 12 is released by the tooth 26 so that it may rotate, the positioning gear 15 and the gears 12 and 14 will be returned to their normal or zero position by the springs 17 and 60. Since the cam 23 operates at a regular speed, the time during which the gear 12 is engaged with the drive gear 11 determines the amount of movement of the positioning gear 15, this movement being permitted during this time since the stop arm 24 is maintained out of engagement with the gear 12 by means of a spring 68 on the arm 18. At the end of this predetermined time interval, governed by the cam 23, the stop lever 24 is operated so as to first hold the gear 12 and then move it out of engagement with the drive gear 11, and maintain the gear 12 held for a very short time during which the indicator wheel and indicator are moved to a position corresponding to the position of the positioning gear 15 before the gear 12 is permitted to return to its zero position.

Engaging with the indicator wheel 7 is a small gear 28 which is mounted upon a shaft 29, suitably journaled in the top and bottom plates 2 and 1 of the instrument. An indicator ratchet holding gear 30 is fixed upon this shaft 29, so as to rotate in unison with the small gear 28. The gear 30 serves as a holding device for the indicator and indicator wheel, so as to normally prevent counterclockwise movement of the indicator, except upon the release of the gear 30. The gear 30 is provided with ratchet teeth 31 upon its entire periphery, which are normally engaged by a holding gear ratchet pawl 32, so as to normally prevent clockwise movement of the gear 30. The ratchet pawl 32 is journaled upon a stud 33 which is fixed in a plate 34 attached to the plate 1 of the instrument. A spring 35 serves to maintain the pawl 32 in engagement with the teeth 31 in a yielding manner. A release arm 36 is provided integral with the ratchet pawl 32, and the end of this release arm is engaged by the cam arm 23 in the movement of the latter so that periodically the release arm 36 will be moved in a clockwise direction through a short distance to release the pawl 32 from the indicator holding wheel 30, and thus permit the indicator to rotate counterclockwise until it assumes the position of the repositioning gear 15. The length of the release arm 36 is such that the gear 30 will be released just after the gear 12 has been engaged by the stop lever 24.

The gear 30 is provided with a large number of the teeth 31, and since the rotation of the gear 30 is transmitted by means of the small gear 28 to the large indicator wheel 7, a comparatively large distance upon the periphery of the gear 30 will correspond to a much smaller peripheral distance upon the indicator wheel 7. Consequently, by holding the gear 30, the error due to the distance between adjacent teeth of the gear 30 will be very small when reduced to the indicator wheel 7. The gear 12 is of large size as compared with the gear 14 which drives a large positioning gear 15, so that the error due to the distance between teeth of the gear 12, as these teeth are engaged by the stop lever 24, is reduced to negligible quantity as apparent upon the positioning gear 15.

In order to transmit the motion of the positioning gear 15 to the indicator wheel 7, the positioning gear 15 is provided with a positioning pin 37 projecting up from the gear which operates against a positioning arm 38, freely rotatable upon the sleeve 16. The positioning pin 37 forces the positioning arm 38 around ahead of it, as the positioning gear 15 is rotated in a clockwise direction. The positioning arm 38 in its movement engages with an indicating wheel pin 39 which projects downwardly from the indicator wheel 7, as shown in Fig. 2. The indicator wheel 7 is thus moved forward or clockwise to a degree dependent upon the movement of the positioning gear 15 by means of the pin 37, arm 38 and pin 39. Should the positioning gear 15 rotate through more than a complete revolution, the pin 37 would come into engagement with the arm 40 which is freely mounted for rotational movement upon the indicator shaft 6. Between the arms 38 and 40, is a third arm 41 which is rigidly attached to the sleeve 16 by means of a square hole in the arm 41, engaging with a square portion of the sleeve 16 as indicated at 42. This arm 41 has a downwardly projecting tip 43 which is engaged by the arm 40 upon two revolutions of the positioning gear 15 to prevent further movement of the positioning gear by throwing the speed decreasing gear 12 out of engagement with the drive gear 11. This occurs since the safety stop arm 41 is rigid with the arm 18 which supports the speed decreasing gear 12; and consequently should the positioning gear 15 tend to rotate more than two complete revolutions, it will be thrown out of engagement immediately. It will thus be impossible to break the instrument, should the device to which it is attached run at excessive speeds.

It will now be clear that when the device is set in operation, the drive member will gear to and will drive the positioning member, and the latter will drive the indicating member during a certain interval of time, and at the end of the time interval, the indicating member is locked from backward rotation while the positioning member is thrown out of gear with the driving member, and permitted to return to its initial position by means of the spring 17. During the second interval of time the positioning member is geared to the driving member, and is driven forward thereby, and at the end of this second time interval, the indicating member is released so that it may move counterclockwise a short distance to assume a position determined by the positioning member at that time. After the indicating member is thus positioned, the positioning member will again return to its initial or zero position to be again driven forward during successive intervals of time. In this way the indicating member is reset at the end of each time interval to indicate the speed of the machine to which the instrument is connected.

The escapement wheel 22 and the cam arm 23 are both rigidly connected to a spindle 44 which is journaled at its ends in the top plate 2 and bottom plate 1. The escapement wheel is driven through the drive shaft 10 which is in constant rotation when in use. The revolution of the drive shaft 10 winds a flat helical spring 45 attached at one end to the shaft, and the other end of this spring is enclosed within the drum 46. The friction of the spring within the drum rotates a gear 47 which is integral with or rigidly attached to the drum 46. Escapement drive gear 47 drives the escapement gear 48 which is rigid with the spindle 44. The spring 45 thus serves as a main spring for the escapement wheel 22. This escapement wheel is provided with four teeth indicated at 49, which are equally spaced apart and released periodically by means of the pallet 50 pivotedly mounted at 51. The pallet and fork lever 52 which provides the pallet 50 at one end is engaged at its other end by a fork pin 53 provided upon balance wheel 54. This balance wheel is provided with the customary hair spring and is mounted upon the spindle 56 journaled in the suitably provided plates of the instrument, the balance wheel 54 being oscillated back and forth at a constant speed by means of the hair spring in the customary manner, and so operates the pallet and fork lever 52 as to cause the periodic release of the escapement wheel, so that this escapement wheel may jump forward ⅛ of a complete revolution each time the escapement wheel is released. If the balance wheel beats ⅛ second, the escapement wheel is permitted to make one complete revolution per second.

Consider the cam 23 in its initial position as shown in Fig. 1 with the pins 37 and 39 and the arms 38 and 40 in their normal position, as also shown in this figure. As the drive shaft is turned tension is put on the main spring, and the escapement starts to operate, speed decreasing gear 12 being in engagement with drive gear 11. The positioning gear 15 is rotated through an angle proportional to the number of revolutions of the drive shaft, during the time cam arm 23 rotates from its initial position to a position where it forces the gear 12 out of engagement with drive gear 11 indicated in Fig. 4. During this time, the positioning gear pin 37 positions the indicator wheel ahead of it a like amount. At the end of this time interval, the gear 12 is released from the gear 11 and held in this position while the positioning gear returns to zero position; the indicator wheel meanwhile being held in its last position, and prevented from returning to othe initial position with the positioning gear. The second period during which the positioning gear is being rotated forwardly extends through a period of six dwelling periods of the cam, or three-fourths of a second. During the seventh periodic movement of the cam, the cam 23 performs three operations practically instantaneously; the first forces stop arm 24 into engagement with a gear 12, holding it stationary, and then forces the gear 12 out of mesh with the drive gear 11, at the same time disengaging ratchet pawl 32 from the indicator holding gear 30. During its eighth, the cam first frees the end of the arm 36 to permit the ratchet pawl 32 to hold the gear 30; it then presses the projection 27 of the stop lever 24, freeing the stop lever 24 from the gear 12, but still holding the gear 12 out of mesh with the drive gear 11. At the end of this eighth period, the projection 27 is entirely freed, and the gear 12 is again returned into mesh with the gear 11 through the tension of the spring 17 which is effective upon the arm 18, so as to urge this arm in counterclockwise direction.

The teeth on the gear 11 and on the gear 12 are made with sides at comparatively steep angles, so as to form what may be termed "saw teeth", so that when the cam arm 24 stops the rotation of the gear 12, the gear 12 may be forced out of engagement with the gear 11 by the teeth of these gears acting upon one another, in case the gear 12 is not immediately forced out of engagement with gear 11 by the continued operation of the cam arm 23.

The driving shaft 10 is shown as mounted at one end in a journal 57 in a plate 58 attached to the bottom plate 1. This plate 58 may serve as a cover plate for a reverse arrangement which gears with the gear 59 on the driving shaft 10, it being understood that gear 59 may be driven through any suitable reversing mechanism from the machine to which the instrument is attached, and whose speed is to be measured. This reversing mechanism may take any form desired, so that the machine to which the instrument is attached may be driven either forward or in reverse direction while the gear 59, and consequently the shaft 10, rotate constantly in a forward direction at all times. Such reversing mechanism is well known in the art, and is not set forth here in detail.

While I have herein set forth one embodiment of my invention in its preferred form for use as a speed indicator, it will be understood that the invention is capable of various modifications and uses, and I do not wish to be limited to the exact construction which has been chosen for the purpose of illustration

I claim:

1. In an instrument for indicating the number of movements of one operation in relation to the number of movements of a second operation, a driving member, a gear, a positioning member which is driven forward through said gear by said driving member during each of a plurality of movements of said operation, and permitted to return to a pre-determined position after said movement, an indicating member positioned by said positioning member, and means controlled by the movements of said second operation for bodily moving said gear to disconnect it from said driving member, while said gear is still engaged with said positioning member.

2. In an instrument for indicating the number of movements of one operation in relation to the number of movements of a second operation, a driving member, a gear, a positioning member which is driven forward through said gear by said driving member during each of a plurality of movements of said one operation and permitted to return to zero position after said movement, an arm supporting said gear and oscillatably mounted about the axis of said positioning member, a spring operating on said positioning member, an indicating member positioned by said positioning member, and means controlled by the movements of said second operation for engaging said gear to hold the same from rotating, and to move said gear and arm against tension of said spring to disengage said gear from said driving member.

3. In an instrument for indicating the number of movements of one operation in relation to the number of movements of a second operation, a driving member, a gear, a positioning member which is driven forward through said gear by said driving member during each of a plurality of movements of said one operation and permitted to return to zero position after said movement, an arm supporting said gear and oscillatably mounted about the axis of said positioning member, a spring operating on said positioning member, an indicating wheel concentric with said positioning member and positioned by said positioning member, means controlled by the movements of said second operation for engaging said gear to hold the same from rotating and to move said gear and arm against the tension of said spring to disengage said gear from said driving member, and a ratchet pawl normally restraining the said indicating wheel against reverse movement and operated to permit said indicating wheel to assume the position of the positioning member when said gear is disengaged from said driving member.

4. In a speed indicator, the combination with a driving member, a gear, a positioning member which is driven forward by the driving member through said gear during each of a plurality of successive time intervals, and is allowed to return to zero position at the end of each time interval, an indicating member positioned by the positioning member, and means for periodically bodily moving said gear about the axis of said positioning member to disengage said gear from said driving member while said gear is still engaged with said positioning member.

5. In a speed indicator, the combination with a driving member, a gear, a positioning member which is driven forward by the driving member through said gear during each of a plurality of successive time intervals, and is allowed to return to zero position at the end of each time interval, an indicating member positioned by the positioning member, means for periodically engaging said gear to hold the same from rotating and to move said gear to disengage it from said driving member.

6. In an indicator of the class described, the combination with a driving member, of a gear, an arm rotatably mounting said gear, a rotary positioning member which is driven forward by said driving member through said gear during each of a plurality of time intervals, and is allowed to return to zero position at the end of each time interval, said arm being rotatably mounted about the axis of said positioning member, an indicating member operated by the positioning member, and means for periodically moving said arm to disengage said gear from said driving member, while said gear is still engaged with said positioning member.

7. In a speed indicator, the combination with a driving member, of a gear, an arm rotatably mounting said gear, a rotary positioning member which is driven forward by said driving member through said gear during each of a plurality of time intervals, and is allowed to return to zero position at the end of each time interval, said arm being rotatably mounted about the axis of said positioning member, an indicating member operated by the positioning member, and a pawl pivoted on said arm and engageable with said gear to hold same and rotate said arm to retain the positioning member in position.

8. In an indicator, the combination with a driving member, of a gear, a positioning member which is driven forward by the driving member through said gear during each of a plurality of successive time intervals and is allowed to return to zero position at the end of each time interval, an indicating member positioned by the positioning member, a holding pawl for said indicating member, an escapement wheel, a cam arm rigid with said escapement wheel, and means operated by said cam arm for engaging said gear, moving said gear out of engagement with said driving member while it is still engaged with said positioning member and temporarily releasing said holding pawl.

9. In an indicator, the combination with a driving member, of a gear, a positioning member which is driven forward by the driving member through said gear during each of a plurality of successive time intervals and is allowed to return to zero position at the end of each time interval, an indicating member positioned by the positioning member, a holding pawl for said indicating member, an escapement wheel, a cam arm rigid with said escapement wheel, and a stop lever operated by said cam arm for engaging said gear, moving said gear out of engagement with said driving member while it is still engaged with said positioning member, said stop arm having an extension adapted to be engaged by the said cam arm to release the gear while holding the gear out of engagement with the said driving member.

10. In a speed indicator, the combination with a driving member, of a gear, a rotary positioning member which is driven forward by said driving member through said gear during each of a plurality of successive time intervals and is allowed to return to zero position at the end of each time interval, an arm pivoted on the axis of rotation of said positioning member, and rotatably supporting said gear, an indicating member positioned by the positioning member, a holding means for said indicating member, an escapement wheel, a cam arm operated by said escapement wheel, a stop lever engageable with said gear and pivoted on said arm and operated by said cam to engage said gear, and then move said arm to disconnect said gear from said driving member.

11. In a speed indicator, the combination with a driving member, of a gear, a rotary positioning member which is driven forward by said driving member through said gear during each of a plurality of successive time intervals and is allowed to return to zero position at the end of each time interval, an arm pivoted on the axis of rotation of said positioning member, and rotatably supporting said gear, an indicating member positioned by the positioning member, a holding means for said indicating member, an escapement wheel, a cam arm rigid with said escapement wheel and engageable with said holding means to operate the same, a stop lever engageable with said gear and pivoted on said arm to be operated by said cam to engage said gear, and then move said arm to disconnect the gear from the driving member, said stop lever having a projection engageable by said cam to cause said stop lever to release the gear while holding the gear out of engagement with said driving member.

12. In a speed indicator, the combination with a driving member, a gear, a positioning member which is driven forward by the driving member through said gear during each of a plurality of successive time intervals, and is allowed to return to zero position at the end of each time interval, an indicating member positioned by the positioning member, means for periodically moving said gear from said driving member while said gear is still engaged with said positioning member, and a pawl engageable with said gear to hold the same for retaining the positioning member in position, the ratio of angular movement of said positioning member to the movement of said gear being a small fraction.

13. In a speed indicator, a driving gear, a positioning gear driven forward through a speed decreasing gear during successive time intervals, spring means for returning said positioning gear to a pre-determined position at the end of each of said time intervals, an arm oscillatably mounted co-axially with said positioning gear and rotatably supporting said speed decreasing gear to maintain said speed decreasing gear always engaged with said positioning gear, an escapement wheel, means connected to said driving gear to rotate said escapement wheel step by step, a cam arm rigid with said escapement wheel, a stop lever engageable with said speed decreasing gear and pivoted on said arm to be operated by said cam arm to engage said speed decreasing gear and move said arm for disengagement of the speed decreasing gear from the driving gear, an extension on said stop lever engageable by said cam arm to maintain the speed decreasing gear disengaged from the said driving gear and release said stop lever from said speed decreasing gear, an indicator, an indicating wheel attached to said indicator and co-axially mounted adjacent to said positioning gear, means for operating said indicator wheel from said positioning gear, a holding gear engageable with periphery of said indicator wheel, a ratchet pawl normally engaged with said holding gear to permit one way movement of said holding gear and indicator, and a release arm on said ratchet pawl engageable directly with said cam arm to release said holding gear temporarily while said speed decreasing gear and positioning gear are held stationary.

14. In an instrument as set forth in claim 1, means for automatically disengaging said gear from said driving member upon pre-determined maximum movement of said positioning member.

15. In an instrument as set forth in claim 3, a stop member for automatically disengaging said gear from said driving member upon pre-determined maximum movement of positioning member.

16. In an indicator as set forth in claim 6, a stop member on said arm automatically operated upon pre-determined maximum movement of said positioning member to move said arm to release the gear from engagement with said driving member.

In testimony whereof I affix my signature.

GEORGE P. LUCKEY.